United States Patent
Du et al.

(10) Patent No.: US 7,728,504 B2
(45) Date of Patent: Jun. 1, 2010

(54) FIELD EMITTING LIGHT SOURCE AND METHOD FOR MAKING THE SAME

(75) Inventors: Bing-Chu Du, Beijing (CN); Jie Tang, Beijing (CN); Liang Liu, Beijing (CN); Cai-Lin Guo, Beijing (CN); Pi-Jin Chen, Beijing (CN); Zhao-Fu Hu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 855 days.

(21) Appl. No.: 11/438,063

(22) Filed: May 18, 2006

(65) Prior Publication Data

US 2007/0051965 A1 Mar. 8, 2007

(30) Foreign Application Priority Data

Jul. 15, 2005 (CN) .................. 2005 1 0036029

(51) Int. Cl.
*H01J 17/49* (2006.01)
(52) U.S. Cl. .................. 313/496; 313/310; 313/311; 313/495
(58) Field of Classification Search ......... 313/495–497, 313/309–311
See application file for complete search history.

(56) References Cited

U.S. PATENT DOCUMENTS 6,825,595 B2 * 11/2004 Jin et al. ................ 313/311
7,365,482 B2 4/2008 Ryu et al.
2001/0054865 A1 * 12/2001 Danjo et al. ............. 313/495
2002/0195924 A1 * 12/2002 Raina ...................... 313/495
2004/0195950 A1 * 10/2004 Ryu et al. ................ 313/311
2005/0280350 A1 * 12/2005 Seon ....................... 313/496

FOREIGN PATENT DOCUMENTS

| JP | 2004178891 | 6/2004 |
| JP | 2004253201 | 9/2004 |
| JP | 2005150107 | 6/2005 |

* cited by examiner

*Primary Examiner*—Bumsuk Won
(74) *Attorney, Agent, or Firm*—Jeffrey T. Knapp

(57) ABSTRACT

A CNT field emitting light source (20) is provided. The light source includes an anode (202), an anode substrate (201), a cathode (214), a cathode substrate (208), a fluorescent layer (203) and a sealing means (205). The anode is configured on the anode substrate, and the cathode is configured on the cathode substrate. The anode and the cathode are oppositely configured to produce a spatial electrical field when a voltage is applied therebetween. The cathode includes an emitter layer (206), capable of emitting electrodes bombarding the cathode and matters attached thereupon when activated and controlled by the spatial electric field, and a conductive layer (207), sandwiched between the cathode substrate and the emitter layer for providing an electrically connection therebetween. The fluorescent layer is configured on a surface of the anode oppositely facing the emitter layer, so as to produce fluorescence when bombarded by electrodes emitted from the emitter layer.

9 Claims, 2 Drawing Sheets

FIELD EMITTING LIGHT SOURCE AND METHOD FOR MAKING THE SAME

BACKGROUND

1. Technical Field

The present invention relates to field emitting light sources and a method for making the same and, particularly, to a carbon nano-tube (CNT) field emitting light source and a method for making the same.

2. Discussion of Related Art

It has been well known that CNTs are ideal for using as emitters of field emitting light source. In a typical CNT field emitting light source, CNTs are distributed on a cathode layer opposite to an anode, on which a fluorescent layer is coated. The cathode with the CNTs distributed thereon, and the anode with a fluorescent layer coated thereon, are sealed in an oxidant proof environment. When a voltage is applied between the cathode and the anode, the CNTs emit electrodes bombarding the fluorescent layer to produce fluorescence thereby. A critical factor to be considered of such a light source is how to distribute the CNTs onto the cathode.

A conventional method for distributing CNTs on the cathode is coating a catalyst layer on the cathode and thereafter growing up CNTs thereon. Another conventional method is directly implanting and fixing a prepared CNT array onto the cathode.

However, both of the foregoing methods are expensive and limited for small size light sources. Therefore, a large size CNT cathode for a field emitting light source and a method for making the same are desired.

SUMMARY

A light source is provided, the light source including an anode and a cathode. The anode has a fluorescent layer coated thereon. The cathode includes a conductive layer and an emitter layer configured on the conductive layer. The emitter is configured for emitting electrodes to bombard the fluorescent layer on the anode, when applied voltages thereon. The emitter layer includes CNTs, a low-melting-point glass and a plurality of conductive particles.

A method for making the emitter layer according to the present light source includes: providing a conductive layer on a cathode; providing a mixture of CNTs, conductive particles and low-melting-point glass powders uniformly mixed together, onto the conductive layer; sintering the mixture and obtaining a glassified emitter layer configured on the cathode.

An advantage of the present light source is it can be made up to almost any size.

Another advantage of the present light source is it is cheaper and suitable for mass production.

A further advantage of the present light source is that the CNTs are firmly fixed on the cathode and not likely to break off, thus the light source has a longer operation lifetime.

BRIEF DESCRIPTION OF THE DRAWINGS

The above-mentioned and other features and advantages of the present light source, and the manner of attaining them, will become more apparent and the invention will be better understood by reference to the following description of its embodiments taken in conjunction with the accompanying drawings.

Figure 1:
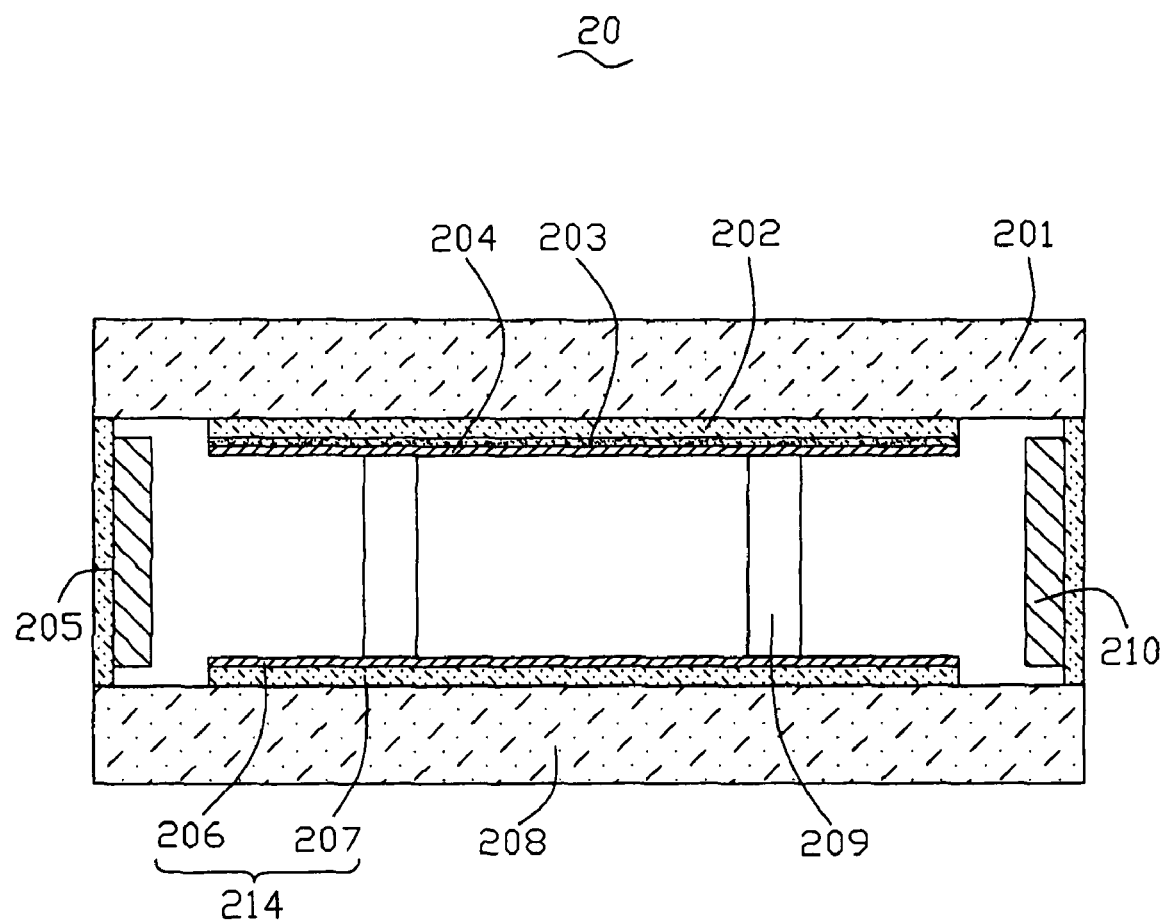
FIG. 1 is a schematic, isometric view showing a light source, according to an exemplary embodiment.

Corresponding reference characters indicate corresponding parts throughout the several views. The exemplifications set out herein illustrate at least one preferred embodiment of the present light source, in one form, and such exemplifications are not to be construed as limiting the scope of such a device in any manner.

DETAILED DESCRIPTION OF PREFERRED EMBODIMENTS

Reference will now be made to the drawings to describe the preferred embodiments of the present light source, in detail.

Referring now to the drawings, and more particularly to FIG. 1, there is shown a light source 20. The light source 20 mainly includes an anode 202, an anode substrate 201, a cathode 214, a cathode substrate 208, a fluorescent layer 203, and a sealing means 205. The cathode 214 includes an emitter layer 206, and a conductive layer 207. The conductive layer 207 is sandwiched between the cathode substrate 208 and the emitter layer 206 for providing an electrical connection therebetween. The anode 202 is configured on the anode substrate 201, and the cathode 214 is configured on the cathode substrate 208. The anode 202 and the cathode 214 are oppositely configured to produce a spatial electrical field when a voltage is applied therebetween, such a spatial electrical field being capable of enabling emitters (not shown in FIG. 1) of the emitter layer 206 to emit electrons (not shown) and guiding the electrons to bombard the anode 202 and the fluorescent layer 203 formed on the anode 202. The fluorescent layer 203 is configured on a surface of the anode 202 oppositely facing the emitter layer 206, so as to produce fluorescence when bombarded by the electrons emitted from the emitter layer 206. The anode substrate 201, the cathode substrate 208 and the sealing means 205 define an air-proofed space, receiving other foregoing discussed items therein.

According to an aspect of the embodiment, the light source 20 further includes a supporter 209 disposed between the anode 202 and the cathode 214 for providing extra fastness and stableness of the light source 20, as well as the emitters. According to another aspect of the embodiment, the light source 20 further includes an aluminum thin film 204 configured on the fluorescent layer 203. The aluminum thin film 204 has a thickness of about 1 micrometer allowing the electrons, emitted from the emitter layer 206, passing therethrough to the fluorescent layer 203 and reflecting fluorescence emitted from the fluorescent layer 203 toward the anode substrate 201.

Furthermore, the light source 20 also includes a nonevaporable getter 210 disposed at a surface of the sealing means 205 for maintaining the air-proofed space non-oxidizing for a longer time. It is to be noted that although the getter 210 is illustrated in the embodiment as disposed at a surface of the sealing means 205, it can be configured in any shape and at anywhere in the air-proofed space, in which an only factor to be considered is the getter 210 should not block paths of the electrons defined by the spatial electric field.

Figure 2:
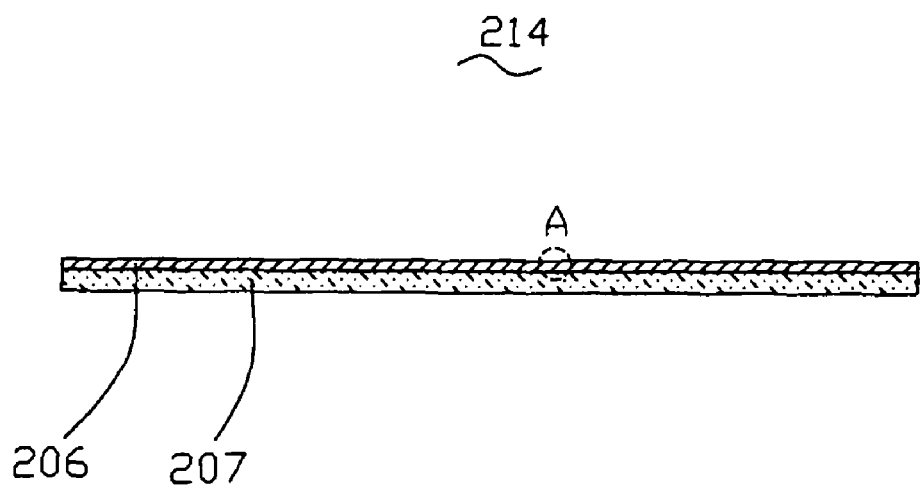
FIG. 2 is a schematic, cutaway view of a cathode with CNT layer thereon of the light source of FIG. 1.
Figure 3:
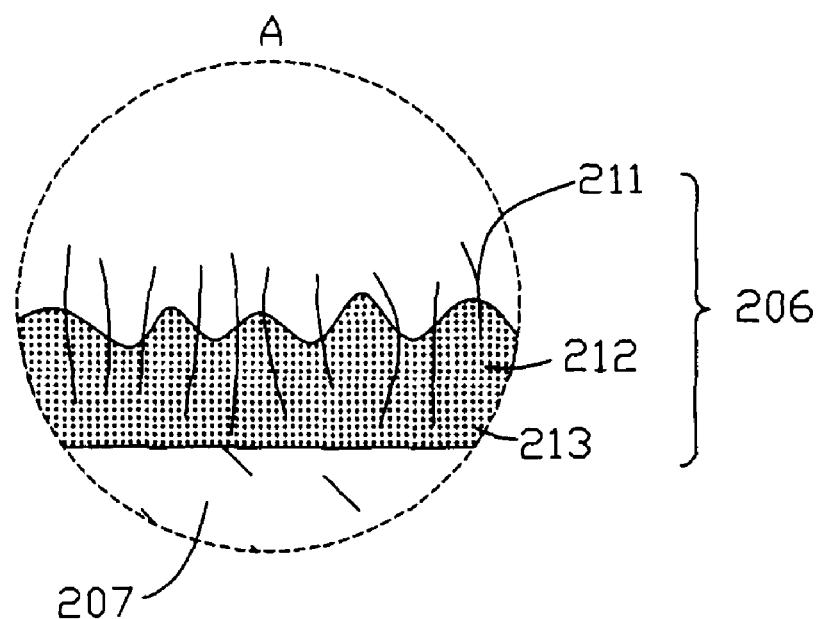
FIG. 3 is a schematic, enlarged view of a part "A" of the CNT layer of FIG. 1.

Referring to FIGS. 2 and 3, there is shown a cathode 214 of FIG. 1. The cathode 214 includes a conductive layer 207 and an emitter layer 206 distributed thereon. The emitter layer 206 is composed of CNTs 211, a low-melting-point glass 212, and conductive particles 213. The CNTs 211 and the conductive particles 213 are dispersed in the low-melting-point glass 212. Some of the CNTs 211 have their ends, substantially perpendicularly protruding out from the low-melting-point glass 212. The conductive particles 213 make the emitter layer 206 electrically conductive to a certain degree. A process for forming such an emitter layer 206 is illustrated below.

A slurry (not shown) that is well stirred, containing CNTs 211, low-melting-point glass powders (not shown), conductive particles 213, and a polymer detergent (not shown), is provided on the conductive layer 207. Percentages of weights of the foregoing ingredients are respectively: about 5% to 15% of CNTs 211, about 10% to 20% of conductive particles 213, about 5% of low-melting-point glass powders, and 60% to 80% of polymer detergent. The slurry is provided onto the conductive layer 207 by a silk-screen printing process and forms a slurry layer. As such, an uplifting movement of the silk-screen during a printing process upwardly pulls up ends of the CNTs 211 out from the printed slurry layer. Thus as shown in FIG. 3, each of the CNTs 211 has an end substantially protruded perpendicularly out from the printed slurry layer. Thereafter, the printed slurry layer is sintered at a given temperature lasting a given time for removing the polymer detergent and glassifying the low-melting-point powders, thus obtaining an CNT emitter layer 206 fastened on the conductive layer 207.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A light source, comprising:
   an anode,
   an anode substrate, the anode being configured on the anode substrate;
   a cathode;
   a cathode substrate, the cathode being configured on the cathode substrate, the anode and the cathode being oppositely configured to produce a spatial electrical field when a voltage is applied therebetween, the cathode comprising:
   an emitter layer, capable of emitting electrons for bombarding the anode when activated and controlled by the spatial electric field, the emitter layer comprising of carbon nanotubes, a low-melting-point glass, and conductive particles, the carbon nanotubes and the conductive particles being dispersed in the low-melting-point glass; wherein some of the carbon nanotubes are dispersed among the conductive particles and protrude out from the low-melting-point glass; and
   a conductive layer, located between the cathode substrate and the emitter layer for providing an electrical connection therebetween;
   a fluorescent layer, configured on a surface of the anode oppositely facing the emitter layer, so as to produce a fluorescence when bombarded by electrons emitted from the emitter layer; and
   a sealing means, the anode substrate, the cathode substrate, and the sealing means configuring an air-proofed space, receiving the anode, the cathode, and the fluorescent layer therein.

2. The light source as described in claim 1 further comprising a supporter disposed between the anode and the cathode.

3. The light source as described in claim 1 further comprising an aluminum thin film configured on the fluorescent layer.

4. The light source as described in claim 3, wherein the aluminum thin film has a thickness of about 1 micrometer allowing the electrons passing therethrough to bombard the fluorescent layer and reflecting the fluorescence emitted from the fluorescent layer toward the anode substrate.

5. The light source as described in claim 1 further comprising a nonevaporable getter disposed at a surface of the sealing means for maintaining the air-proofed space non-oxidizing.

6. The light source as described in claim 1, wherein the ends of the protruded CNTs are substantially perpendicular to the low-melting-point glass.

7. The light source as described in claim 1, wherein weights of the carbon nanotubes, the low-melting-point glass, and the conductive particles is in a ratio of 5~15:5:10~20.

8. The light source as described in claim 1, wherein weights of the carbon nanotubes, the low-melting-point glass, and the conductive particles is in a ratio of 5:5:10.

9. The light source as described in claim 1, wherein weights of the carbon nanotubes, the low-melting-point glass, and the conductive particles is in a ratio of 15:5:20.

* * * * *